United States Patent
Bezalel et al.

(10) Patent No.: US 9,021,581 B1
(45) Date of Patent: Apr. 28, 2015

(54) METHODS, SYSTEMS, AND COMPUTER PROGRAM PRODUCTS FOR UPDATING USER PERMISSIONS ASSOCIATED WITH OBJECT LOCATIONS WHEN AN OBJECT CHANGES LOCATIONS IN A VIRTUALIZATION ENVIRONMENT

(71) Applicant: CA, Inc., Islandia, NY (US)

(72) Inventors: Yaakov Bezalel, Holon (IL); Nir Barak, Karmei Yosef (IL)

(73) Assignee: CA, Inc., New York, NY (US)

( * ) Notice: Subject to any disclaimer, the term of this patent is extended or adjusted under 35 U.S.C. 154(b) by 74 days.

(21) Appl. No.: 13/793,612

(22) Filed: Mar. 11, 2013

(51) Int. Cl.
- G06F 21/00 (2013.01)
- G06F 21/30 (2013.01)
- G06F 9/455 (2006.01)

(52) U.S. Cl.
CPC ............... *G06F 21/30* (2013.01); *G06F 9/455* (2013.01)

(58) Field of Classification Search
None
See application file for complete search history.

(56) References Cited

U.S. PATENT DOCUMENTS

| | | | |
|---|---|---|---|
| 2002/0095571 A1* | 7/2002 | Bradee | 713/164 |
| 2002/0112163 A1* | 8/2002 | Ireton | 713/176 |
| 2008/0306954 A1* | 12/2008 | Hornqvist | 707/9 |
| 2009/0327575 A1 | 12/2009 | Durham et al. | |
| 2012/0066762 A1* | 3/2012 | Todorovic | 726/22 |

* cited by examiner

*Primary Examiner* — David Le
(74) *Attorney, Agent, or Firm* — Myers Bigel Sibley & Sajovec, P.A.

(57) ABSTRACT

A method of managing a virtualization system includes detecting a change in location of an object within a virtualization environment, determining user permission rights for a current location of the object responsive to detecting the change in location of the object, and updating a record of user permission rights with the user permission rights for the current location of the object. Related systems and computer program products are also disclosed.

16 Claims, 6 Drawing Sheets

METHODS, SYSTEMS, AND COMPUTER PROGRAM PRODUCTS FOR UPDATING USER PERMISSIONS ASSOCIATED WITH OBJECT LOCATIONS WHEN AN OBJECT CHANGES LOCATIONS IN A VIRTUALIZATION ENVIRONMENT

BACKGROUND

The present disclosure relates to computing systems, and, in particular, to maintaining the security of computing systems in virtual operating environments.

Cloud computing is a computing paradigm where shared resources, such as processor(s), software, and information, are provided to computers and other devices on demand typically over a network, such as the Internet. In a cloud computing environment, details of the computing infrastructure, e.g., processing power, data storage, bandwidth, and/or other resources are abstracted from the user. The user does not need to have any expertise in or control over such computing infrastructure resources. Cloud computing typically involves the provision of dynamically scalable and/or virtualized resources over the Internet. A user may access and use such resources through the use of a Web browser. A typical cloud computing provider may provide an online application that can be accessed over the Internet using a browser. The cloud computing provider, however, maintains the software for the application and some or all of the data associated with the application on servers in the cloud, i.e., servers that are maintained by the cloud computing provider rather than the users of the application.

FIG. 1 illustrates a conventional cloud service model that includes Infrastructure as a Service (IaaS), Platform as a Service (PaaS), and Software as a Service (SaaS). Infrastructure as a Service, delivers computer infrastructure—typically a platform virtualization environment—as a service. Rather than purchasing servers, software, data-center space or network equipment, clients instead buy those resources as a fully outsourced service. Suppliers typically bill such services on a utility computing basis and the amount of resources consumed. Platform as a Service delivers a computing platform as a service. It provides an environment for the deployment of applications without the need for a client to buy and manage the underlying hardware and software layers. Software as a Service delivers software services over the Internet, which reduces or eliminates the need for the client to install and run an application on its own computers, which may simplify maintenance and support.

Virtualized computing environments may be used to provide computing resources to end users. In a cloud computing environment, the physical hardware configuration is hidden from the end user. Cloud computing systems may include servers, network storage devices, routers, gateways, communication links, and other devices. Because the physical hardware and software platforms on which cloud computing system is implemented are hidden within a "cloud," they can be managed, upgraded, replaced or otherwise changed by a system administrator without the customer being aware of or affected by the change.

In a typical cloud computing environment, applications may be executed on virtual machines, which are isolated guest operating systems installed within a host system. Virtual machines are typically implemented with either software emulation or hardware virtualization, or both. A single hardware and/or software platform may host a number of virtual machines, each of which may have access to some portion of the platform's resources, such as processing resources, storage resources, etc.

Virtual machines are typically placed in virtualization environments. A virtualization environment logically organizes the virtual machines along with other hardware and/or software resources by defining the relationships and connections between these various entities. For example, a virtualization environment may be represented as a hierarchical collection of folders or containers. One folder or container may be used to define a data center. Within the data center folder, one or more folders may be created to represent host machines. And within a host machine folder, one or more folders may be created to represent virtual machines that are supported by that particular host machine.

Because cloud computing treats computing resources as remote services that are accessed by customers, and because the actual physical resources that are used to implement a cloud computing environment may be accessed by many different customers, security is generally an important aspect of cloud computing. A virtual machine or other entity in a virtualization environment typically has rights or permissions associated therewith for users that have access to the virtual machine or other entity in the virtualization environment. These rights or permissions generally need to be carefully managed to avoid a potential degradation in security due to the rights or permissions being inaccurate.

SUMMARY

In some embodiments of the inventive subject matter, a method of managing a virtualization system comprises performing operations as follows wherein at least a portion of at least one of the operations is performed on at least one processor: detecting a change in location of an object within a virtualization environment, determining user permission rights for a current location of the object responsive to detecting the change in location of the object, and updating a record of user permission rights with the user permission rights for the current location.

In other embodiments, the method further comprises deleting user permission rights for a previous location of the object from the record of user permission rights responsive to detecting the change in location of the object.

In still other embodiments, the change in location may be movement of the object from a first container in the virtualization environment to a second container in the virtualization environment.

In still other embodiments, the virtualization environment may be a first virtualization environment and the change in location may be movement of the object from the first virtualization environment to a second virtualization environment.

In still other embodiments, the object is a virtual machine.

In still other embodiments, the method further comprises defining preauthorization permissions for object operations.

In still other embodiments, the preauthorization permissions comprise permission to add an object to the virtualization environment, permission to clone an object, permission to backup an object, and/or permission to add data for storage in an object.

In still other embodiments, one of the preauthorization permissions is based on location in the virtualization environment.

In still other embodiments, one of the preauthorization permissions is based on an identification of a user associated with a request to perform an operation on an object.

In still other embodiments, the method further comprises receiving a request to perform an operation on the object, determining if the operation is permissible based on the pre-authorization permissions for the current location of the object, and allowing the operation when the operation is determined to be permissible.

In still other embodiments, the method further comprises associating user permission rights with a user role and determining that a user is assigned to the user role. Updating the record of user permission rights associated with the object locations comprises updating the record of user permission rights associated with the object locations with the user permission rights associated with the user role.

In still other embodiments, updating the record of user permission rights associated with the object locations comprises determining if the user permission rights for the current location can be updated in the record of user permission rights without authorization and updating the record of user permission rights associated with the object locations with the user permission rights for the current location responsive to determining that the user permission rights for the current location can be updated in the record of user permission rights without authorization.

In still other embodiments, updating the record of user permission rights associated with the object locations further comprises initiating an authorization request to update the user permission rights for the current location responsive to determining that the user permission rights for the current location cannot be updated in the record of user permission rights without authorization, receiving authorization to update the record of user permission rights associated with the object locations with the user permission rights for the current location, and updating the record of user permission rights associated with the object locations with the user permission rights for the current location responsive to receiving authorization to update the record of user permission rights associated with the object locations with the user permission rights for the current location.

In further embodiments of the inventive subject matter, a virtualization system comprises a permission store to maintain a record of user permission rights associated with object locations in the virtualization system, a dynamic monitor to detect a change in location of an object within a virtualization environment, and a permission controller to determine the user permission rights for a current location of the object responsive to detection of the change in location of the object, and to update the record of user permission rights with the user permission rights for the current location of the object.

In still further embodiments, the permission controller is further to delete user permission rights for a previous location of the object from the record of user permission rights responsive to detecting the change in location of the object.

In still further embodiments, the change in location may be movement of the object from a first container in the virtualization environment to a second container in the virtualization environment.

In still further embodiments, the virtualization environment may be a first virtualization environment and wherein the change in location is movement of the object from the first virtualization environment to a second virtualization environment.

In still further embodiments, the object is a virtual machine.

In other embodiments of the inventive subject matter a computer program product for managing a virtualization system comprises a computer readable storage medium having computer readable program code embodied in the medium. The computer readable program code comprises computer readable program code to detect a change in location of an object within a virtualization environment, computer readable program code to determine user permission rights for a current location of the object responsive to detecting the change in location of the object, and computer readable program code to update a record of user permission rights with the user permission rights for the current location of the object.

In still other embodiments, the computer program product further comprises computer readable program code to delete user permission rights for a previous location of the object from the record of user permission rights responsive to detecting the change in location of the object.

It is noted that aspects of the inventive concepts described with respect to one embodiment may be incorporated in a different embodiments although not specifically described relative thereto. That is, all embodiments and/or features of any embodiments can be combined in any way and/or combination. These and other objects and/or aspects of the present inventive concepts are explained in detail in the specification set forth below.

Other methods, systems, articles of manufacture, and/or computer program products according to embodiments of the inventive subject matter will be or become apparent to one with skill in the art upon review of the following drawings and detailed description. It is intended that all such additional systems, methods, articles of manufacture, and/or computer program products be included within this description, be within the scope of the present inventive subject matter, and be protected by the accompanying claims.

BRIEF DESCRIPTION OF THE DRAWINGS

Other features of exemplary embodiments will be more readily understood from the following detailed description of specific embodiments thereof when read in conjunction with the accompanying drawings, in which.

DETAILED DESCRIPTION

Figure 1:
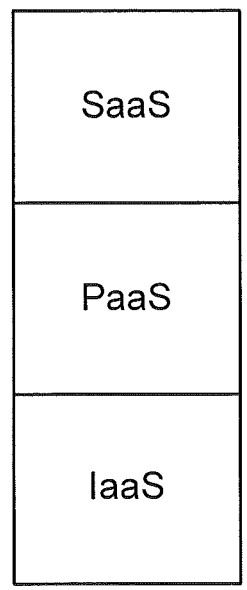
FIG. 1 is a block diagram that illustrates cloud computing paradigm.

As will be appreciated by one skilled in the art, aspects of the present disclosure may be illustrated and described herein in any of a number of patentable classes or contexts including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product comprising one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

Figure 2:
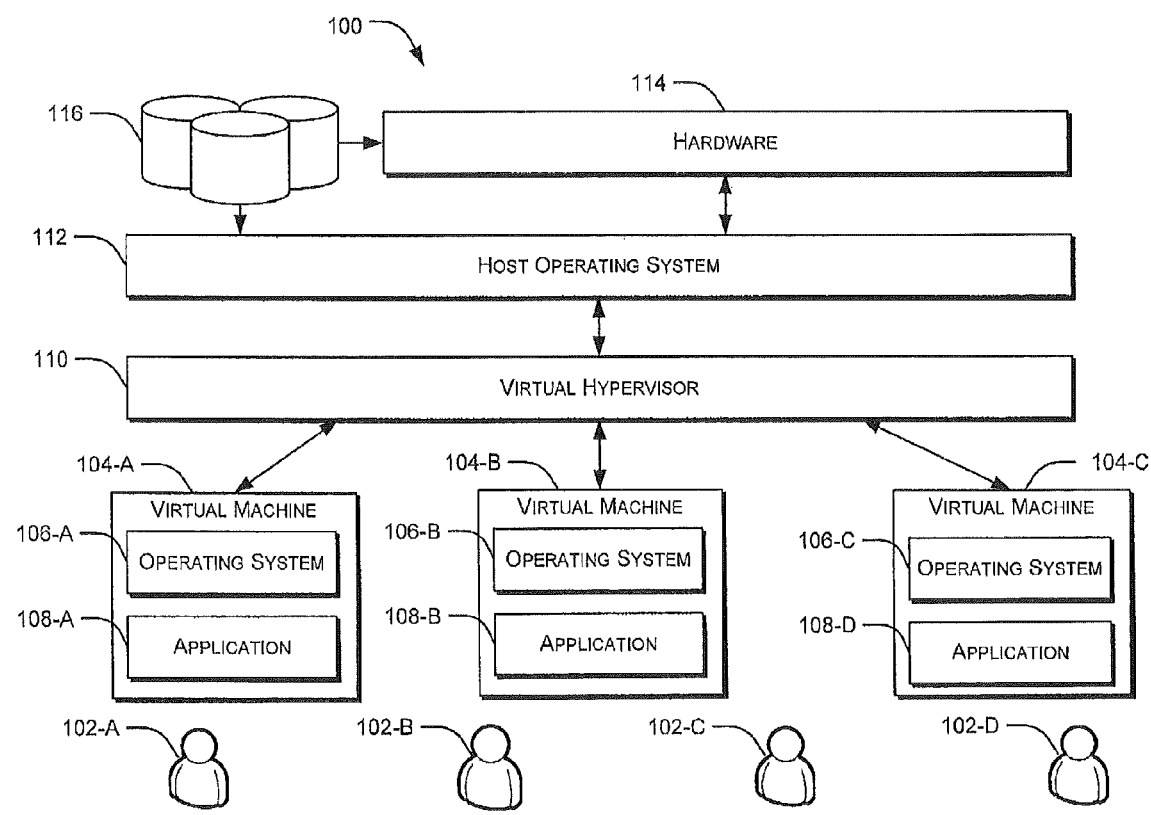
FIG. 2 is a block diagram that illustrates a virtualized computing environment.

FIG. 2 illustrates an exemplary server system 100 for a virtualized computing environment in which the inventive subject matter of the present disclosure can function. The server system 100 generally hosts one or more virtual machines 104 (hereafter virtual machine 104), each of which runs a guest operating system 106 and application 108. The computing needs of users 102 drive the functionality of the virtual machines 104. A virtual hypervisor 110 provides an interface between the virtual machines 104 and a host operating system 112 and allows multiple guest operating systems 106 and associated applications 108 to run concurrently. The host operating system 112 handles the operations of a hardware platform 114 capable of implementing virtual machines 104. A data storage space 116 may be accessed by the host operating system 112 and is connected to the hardware platform 114.

The hardware platform 114 generally refers to any computing system capable of implementing virtual machines 104, which may include, without limitation, a mainframe, personal computer (PC), micro-computer, handheld computer, mobile computing platform, server, or any other appropriate computer hardware. The hardware platform 114 may include computing resources, such as a central processing unit (CPU); networking controllers; communication controllers; a display unit; a program and data storage device; memory controllers; input devices (e.g., a keyboard, a mouse, etc.) and output devices, such as printers. The CPU may be any conventional processor, such as the AMD Athlon™ 64, or Intel® Core™ Duo.

The hardware platform 114 may be further connected to the data storage space 116 through serial or parallel connections. The data storage space 116 may be any suitable device capable of storing computer-readable data and instructions, and it may include logic in the form of software applications, random access memory (RAM), or read only memory (ROM), removable media, or any other suitable memory component. According to the illustrated embodiment, the host operating system 112 stands between the hardware platform 114 and the users 102 and is responsible for the management and coordination of activities and the sharing of the computing resources. In other embodiments, the virtual hypervisor runs directly on the hardware 114 without the intervening host operating system 112.

Although some embodiments of the computer system 100 can be configured to operate as a computer server, the computer system 100 is not limited thereto and can be configured to provide other functionality, such as data processing, communications routing, etc.

Besides acting as a host for computing applications that run on the hardware platform 114, the host operating system 112 may operate at the highest priority level in the server 100, executing instructions associated with the hardware platform 114, and it may have exclusive privileged access to the hardware platform 114. The priority and privileged access of hardware resources affords the host operating system 112 exclusive control over resources and instructions, and may preclude interference with the execution of different application programs or the operating system. The host operating system 112 creates an environment for implementing a virtual machine, hosting the "guest" virtual machine. One host operating system 112 is capable of implementing multiple isolated virtual machines simultaneously.

A virtual hypervisor 110 (which may also be known as a virtual machine monitor or VMM) runs on the host operating system 112 and provides an interface between the virtual machines 104 and the hardware platform 114 through the host operating system 112. The virtual hypervisor 110 virtualizes the computing system resources and facilitates the operation of the virtual machines 104. The hypervisor 110 may provide the illusion of operating at the highest priority level to the guest operating systems 106. The virtual hypervisor 110 maps the guest operating system's priority level to a priority level lower than the top most priority level. As a result, the virtual hypervisor 110 can intercept the guest operating system 106 to execute instructions that require virtualization assistance. Alternatively, the virtual hypervisor 110 may emulate or actually execute the instructions on behalf of the guest operating system 106. Software operations permitting indirect interaction between the guest operating system 106 and the physical hardware platform 114 are also performed by the virtual hypervisor 110.

Virtual machines 104 present a virtualized environment to guest operating systems 106, which in turn provide an operating environment for applications 108 and other software constructs.

Figure 3:
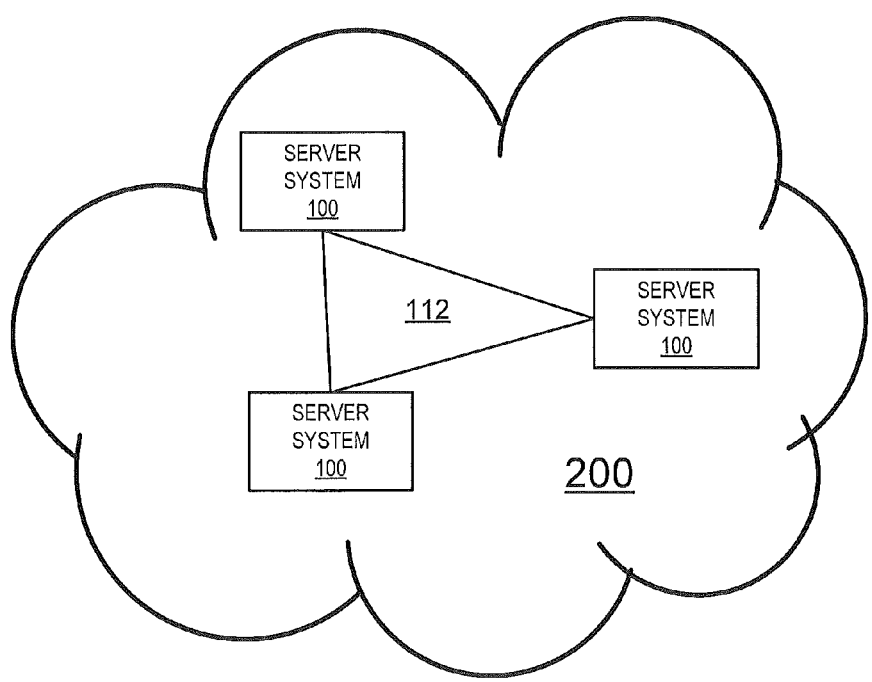
FIG. 3 is a block diagram that illustrates a cloud computing environment.

Referring to FIG. 3, a virtualized computing environment 200 (referred to generally as cloud 200) may include one or more server systems 100 that may include one or more electronic computing devices operable to receive, transmit, process, and store data. For example, the servers in the cloud 200 may include one or more general-purpose PCs, Macintoshes, micro-computers, workstations, Unix-based computers, server computers, one or more server pools, or any other suitable devices. In certain embodiments, the cloud 200 may include a web server. In short, the cloud 200 may include any suitable combination of software, firmware, and hardware.

The cloud 200 may include a plurality of server systems 100 that are communicatively coupled via a network 112. The network 112 facilitates wireless or wireline communication, and may communicate using, for example, IP packets, Frame Relay frames, Asynchronous Transfer Mode (ATM) cells, voice, video, data, and other suitable information between network addresses. The network 112 may include one or more local area networks (LANs), radio access networks (RANs), metropolitan area networks (MANS), wide area networks (WANs), all or a portion of the global computer network known as the Internet, and/or any other communication system or systems at one or more locations. Although referred to herein as "server systems," it will be appreciated that any suitable computing device may be used.

Virtual machines and/or other objects in a virtualization environment can be grouped into logical clusters for management and/or operational purposes. For example, virtual machines can be grouped into clusters based on load balancing needs, security needs, redundancy needs, or any other needs as determined by a system administrator. The virtual machines grouped within a cluster may or may not all be implemented on a single physical server. Any desired number of clusters can be defined subject to system limitations, and each of the clusters can include any desired number of virtual machines subject to server limitations.

Virtual machines can be deployed in particular virtualization environments and organized to increase the efficiency of operating and/or managing a virtual computing environment. For example, virtual machines may be grouped into clusters to provide load balancing across multiple servers.

Virtual machines within a same cluster can be managed by a single virtualization environment manager to have same or similar resource access privileges (e.g., processor utilization, priority, memory allocation, communication interface access privileges, etc.), while virtual machines within different clusters can have different resource access privileges.

Virtual machines that are deployed within a single cluster may share physical resources within a server. For example, virtual machines that are deployed within a single cluster may share physical memory, storage, communication facilities and other resources or services of a server. Whenever computing resources are shared, there is the possibility that one virtual machine could intentionally or unintentionally gain access to data of another virtual machine.

Embodiments are described herein with respect to detecting movement of a virtual machine from one location or container to another in a virtualization environment. It will be understood that the present inventive subject matter is not limited to such embodiments and is applicable generally to movement of any object in a virtualization environment including, but not limited to, a virtual machine, a data storage element, a switch, a router, a data center, a host processor/system, a cluster, an application, a hypervisor, a host operating system, a guest operating system, and the like.

Some embodiments described herein stem from a realization that when an object moves in a virtualization environment, the user rights/permissions typically need to be created for the object in the target location or container and the user rights/permissions removed for the object that are based on the object's prior or source location or container. In large environments it can be difficult to manually clean up permissions that are no longer relevant. According to some embodiments, user rights/permissions in a virtualization environment can be updated by detecting when an object moves from one location or container to another and programmatically adding the user/rights permissions in the new or target location or container and/or removing the user/rights permissions in the prior or source location or container. Such user rights/permissions management may be performed without the need for manual intervention from an administrator.

When an object is moved from one location or container to another in a virtualization environment, the user or party requesting the move may not be allowed to make such a change and update the user rights/permissions for the new location or container without prior authorization from the appropriate authority. According to some embodiments of the inventive subject matter an authorization request to the appropriate authority is initiated when an object move requires approval.

Figure 4:
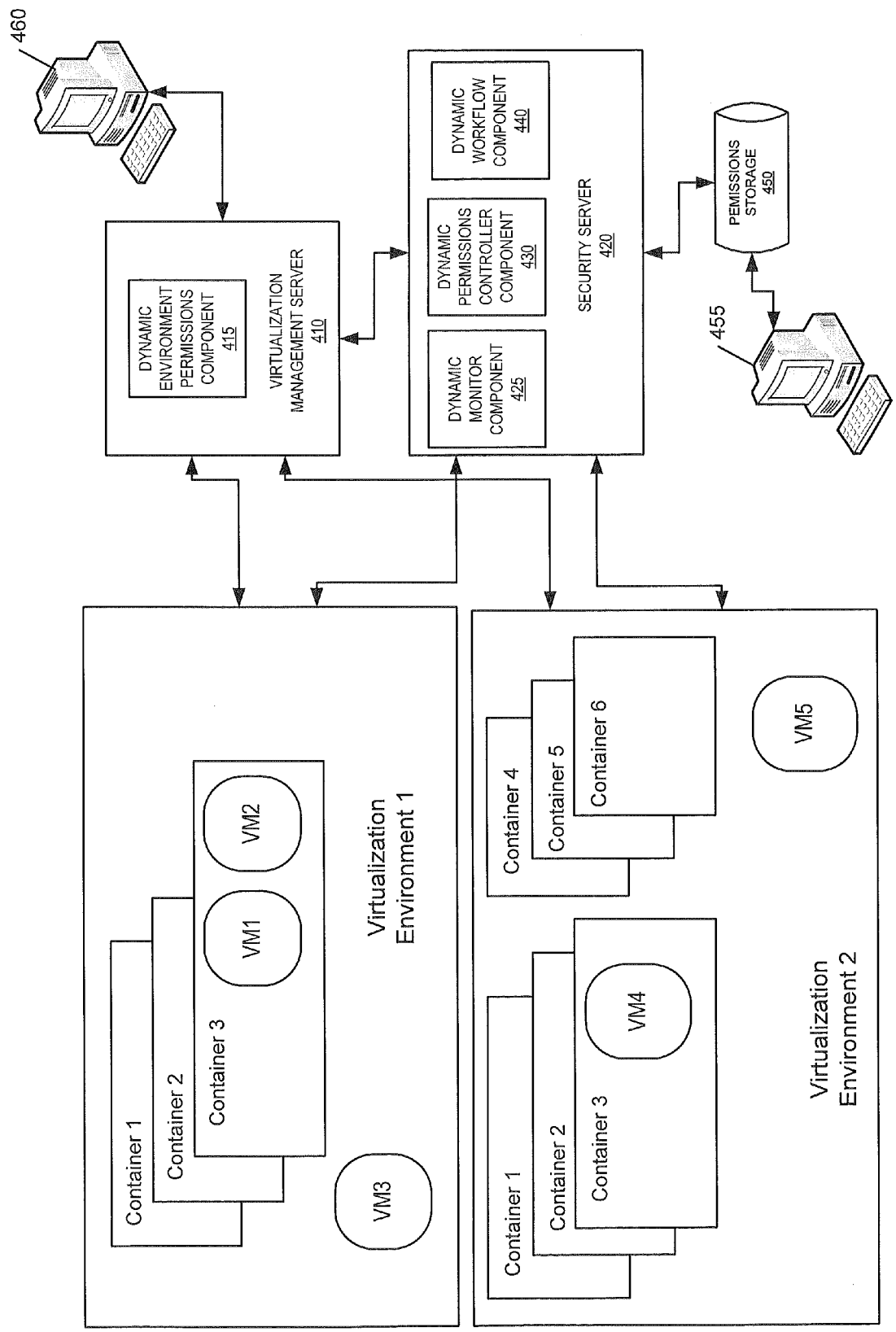
FIG. 4 is a block diagram that illustrates a virtualization system according to some embodiments.

Referring to FIG. 4, a virtualization system 400 according to some embodiments includes two virtualization environments: Virtualization Environment 1 (VE1) and Virtualization Environment 2 (VE2). VE1 includes three containers—Containers 1, 2, and 3—with Container 3 including two virtual machines VM1 and VM2. A third virtual machine VM3 is not assigned to any container. VE2 includes six containers with Containers 1, 2, and 3 being associated with each other and Containers 4, 5, and 6 being associated with each other. Container 3 includes a virtual machine VM4. A fifth virtual machine VM5 is not assigned to any container.

The virtualization system 400 further includes a virtualization management server 410 that includes a dynamic environment permissions component 415 and a security server 420 that includes a dynamic monitor component 425, a dynamic permissions controller component 430, and a dynamic workflow component 440.

The virtualization management server 410 manages VE1 and VE2 including all of the objects in the two virtualization environments VE1 and VE2. The dynamic environment permissions component 415 may be configured to act as an interface through one or more Application Programming Interface (API) modules to gather information on objects, such as VMs in the virtualization environments VE1 and VE2, and provide this information to the security server 420. The security server 420 may use the information obtained through the dynamic environment permissions component to update the user rights/permissions in the permissions storage element 450 for the various object locations in the virtualization environments VE1 and VE2.

The security server 420 may provide general security functionality, such as security policy management and the like. In addition, the security server 420, may provide user rights/permission management functionality for object locations in the virtualization environments VE1 and VE2. The dynamic monitor component 425 monitors the virtual environments to determine whether an object, such as a virtual machine, has changed locations. In accordance with various aspect of the present disclosure, a change in location may include, but is not limited to, moving from one container to another in the same virtualization environment, moving out of a container and having no container association in a virtualization environment (e.g., moving VM1 out of Container 3 to a state like VM3), moving into a container from a no container association state (e.g., moving VM3 into Container 3), moving between virtualization environments, being created in a virtualization environment, and being removed from a virtualization environment. The dynamic monitor component 425 provides the dynamic permissions controller component 430 with the information regarding any movement of objects in the virtualization environments.

The dynamic permissions controller component 430 receives information from the dynamic monitor component 425 regarding an object in the virtualization environments VE1 and VE2 that has changed locations. The dynamic permissions controller component 430 determines the new user rights/permissions for the new location object the object and, if allowed, updates the permissions storage 450 with the new user rights/permissions. If the previous location of the object had user rights/permissions associated with it before the change, then the dynamic permissions controller component 430 removes those user rights/permissions from the permissions storage 450. A newly added object to a new location would not have any associated previous user rights/permissions associated with the location and, therefore, would not need to have previous user rights/permissions removed from the permissions storage 450.

If the user rights/permissions cannot be updated for an object location without authorization from an authority, then the dynamic workflow component 440 initiates an authorization request to be communicated to the appropriate party/parties for reviewing the request. When the necessary authorization(s) are received from the party/parties reviewing the request, the dynamic workflow component 440 informs the dynamic permissions controller component 430 that the user rights/permissions for the object location can be updated based on the move as described above.

The virtualization system 400 further includes administrator computers/terminals 455 and 460. These two computers/terminals 455/460 may be separate computers/terminals or may be embodied as the same computer/terminal. An administrator may review and edit the user rights/permissions for the various object locations in the virtualization system 400 through the computer/terminal 455. An administrator may manage the entire virtualization system 400 through the computer/terminal 460 including moving objects within the virtualization environments VE1 and VE2.

Figure 5:
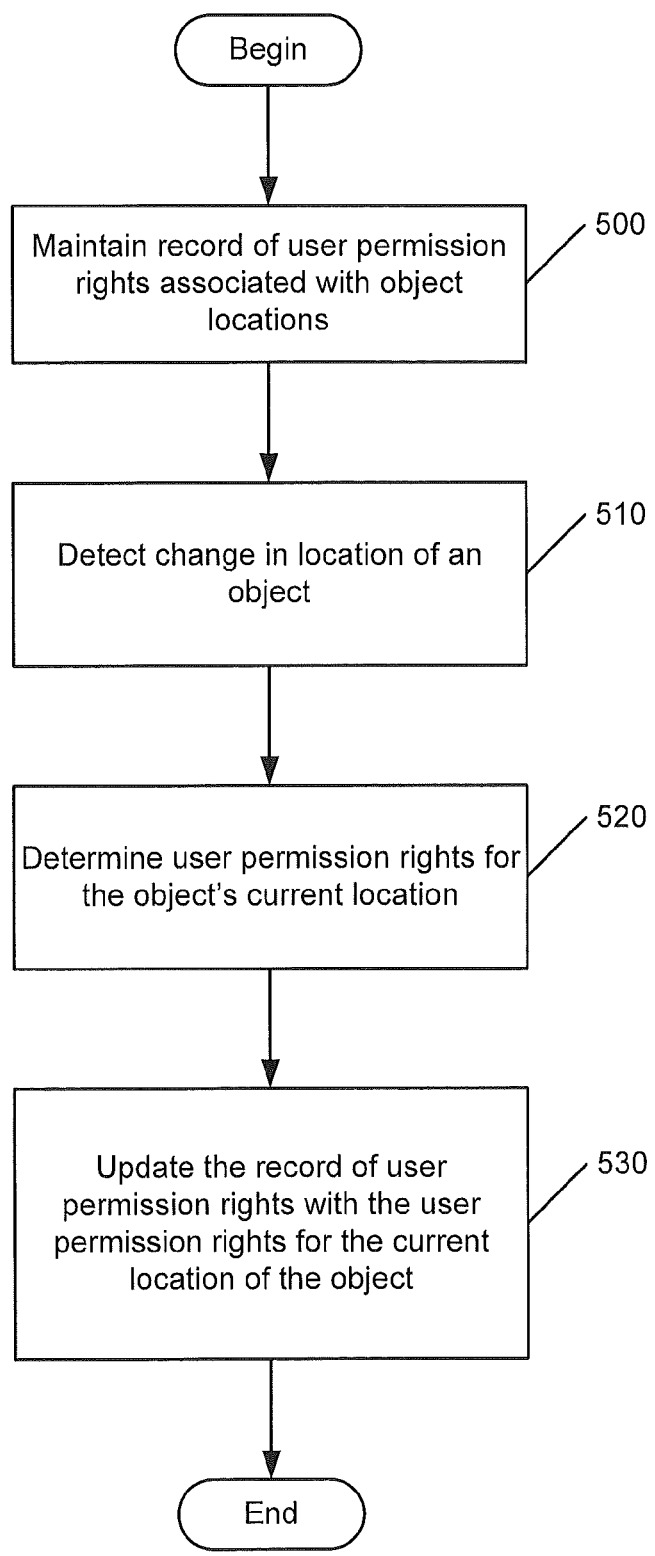
FIG. 5 is a flowchart that illustrates exemplary operations for managing a virtualization system, such as the virtualization system FIG. 4, according to some embodiments.

FIG. 5 is a flowchart that illustrates exemplary operations for managing a virtualization system, such as the virtualization system 400 of FIG. 4, according to some embodiments. Operations begin at block 500 where the security server 420 maintains records of user permission rights associated with one or more object locations in the virtualization environments VE1 and VE2 in the permissions storage element 450. The dynamic monitor component 425 detects that an object has moved in the virtualization environments VE1 and VE2 at block 510. According to some embodiments, certain locations may impose limitations on what operations can be performed on an object without authorization and/or preauthorization. According to some embodiments of the inventive subject matter, operations on an object may be preauthorized through a set of preauthorization permissions or rules that are associated with an object location, for example. Such operations may include, but are not limited to, adding an object to a virtualization environment, cloning an object, performing a backup of the object, and adding data for storage in an object. Thus, an administrator may through computer/terminal 460 via the virtualization management server request to move the location of an object in the virtualization environments VE1 and VE2 as described above and this request may be denied if there are preauthorization permissions for the particular location(s) in the virtualization environments that are not satisfied. The preauthorization permissions may be based on the location of the object in the virtualization environments VE1 and VE2 and/or an identity of a user associated with the request to perform the operation on the object. The requested operation on the object, such as a move, is allowed when all preauthorization permissions are satisfied for the object.

When a change in an object's location is detected, however, the dynamic permissions controller component 430 determines the user rights/permissions associated with the object's current, i.e., new location at block 520. The dynamic permissions controller component 430 then updates the record of user rights/permissions in the permissions storage 450 at block 530 with the user rights/permissions associated with the objects current (i.e., new location). The dynamic permissions controller component 430 may also remove any user rights/permissions associated with the object's previous location (i.e., source location before the move) from the permissions storage 450.

According to some embodiments, a user may be assigned to a user role that has certain user permission rights associated therewith. When the dynamic permissions controller component 430 updates the user rights/permissions for a location in the permissions storage 450, the dynamic permissions controller component 430 may include those user permission rights associated with the role. Through the use of roles, multiple rights/permissions may be conveniently assigned to one or more users by assigning the user(s) to a particular user role.

Figure 6:
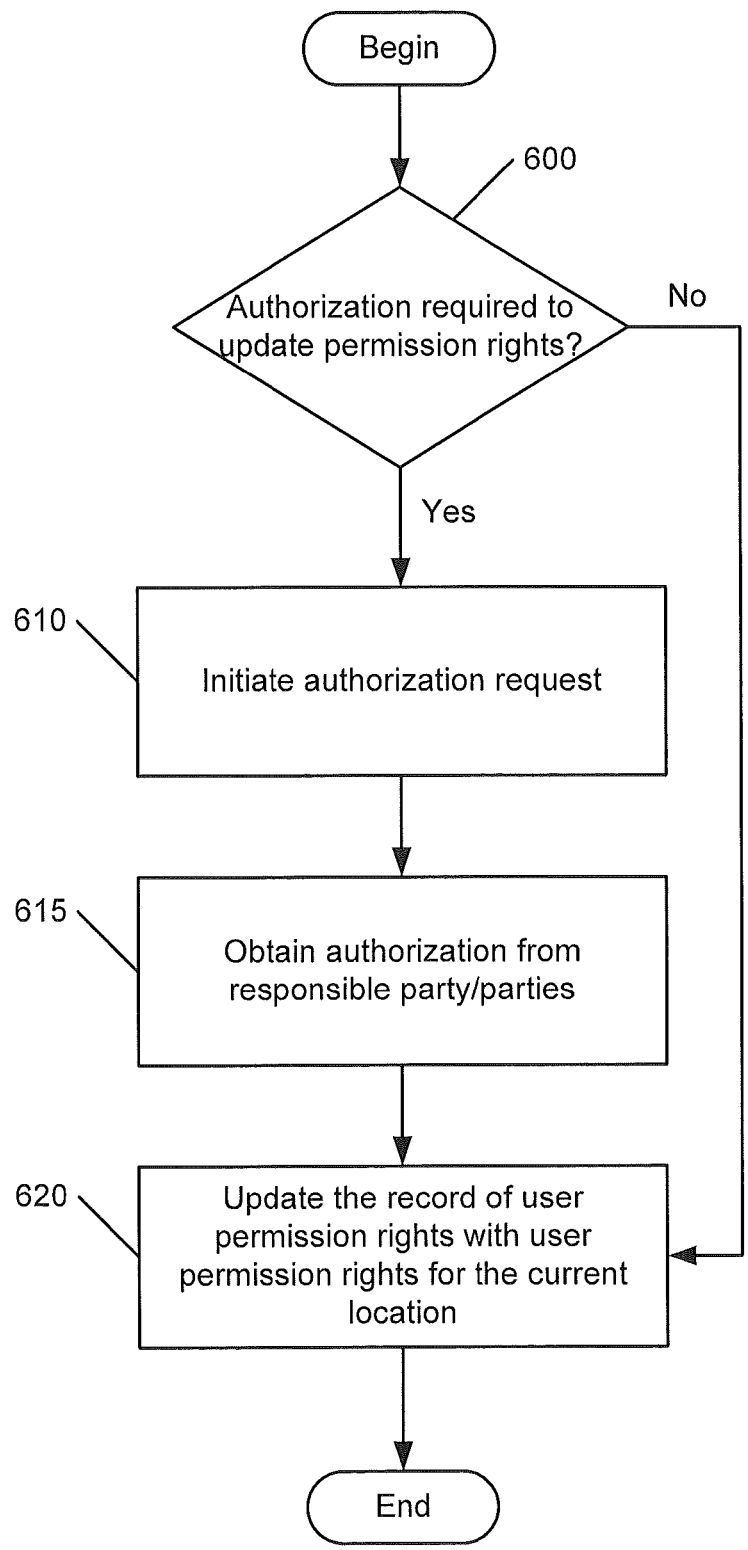
FIG. 6 is a flowchart that illustrates exemplary operations for obtaining authorization for updating user rights/permissions for an object location according to some embodiments.

FIG. 6 is a flowchart that illustrates exemplary operations for obtaining authorization for updating user rights/permissions for a new object location according to some embodiments. As described above, authorization from one or more authorities may be required before user rights/permissions can be updated for a new object location in the virtualization system 400. Operations begin at block 600 where the dynamic, permissions controller component 430 determines whether authorization is required to update user rights/permissions for a new object location. If authorization is required, the dynamic workflow component 440 at block 610 initiates an authorization request for the update to the user rights/permissions for the new location, which is communicated to the appropriate parties that can approve the update. At block 615, the dynamic workflow component 440 receives authorization for the update to the user rights/permissions for the new location. The dynamic permissions controller component 430 updates the record of user rights/permissions with the user rights/permissions for the current (i.e., new location) location of the object in the permissions storage 450 at block 620 responsive to receiving authorization from the responsible party/parties or if authorization is not required as determined at block 600.

The embodiments of methods, systems, and computer program products described herein may allow for automatic updating of user rights/permissions for object locations or containers when objects in a virtualization system are created, moved, or removed. Any existing user rights/permissions associated with a previous location may be automatically removed and the new user rights/permissions associated with a new location are automatically created without the need for manual intervention. An administrator may, thus, be relieved of the necessity of creating user rights/permissions for a new object location at the time an object is being moved. Moreover, an administrator need not schedule periodic maintenance for a virtualization system for cleaning (i.e., removing) old user rights/permissions associated with previous object locations that are no longer relevant due to object moves in the system.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Like reference numbers signify like elements throughout the description of the figures.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

That which is claimed:

1. A method of managing a virtualization system, comprising:
    performing operations as follows wherein at least a portion of at least one of the operations is performed on at least one microprocessor:
    detecting a change in location of an object within a virtualization environment;
    determining user permission rights for a current location of the object responsive to detecting the change in location of the object; and
    updating a record of user permission rights with the user permission rights for the current location of the object;
    wherein the virtualization environment is a first virtualization environment and the change in location is one of the following:
        movement of the object from a first container in the virtualization environment to a second container in the virtualization environment the first and second containers being logically independent of each other; and
        movement of the object from the first virtualization environment to a second virtualization environment.

2. The method of claim 1, further comprising:
    deleting user permission rights for a previous location of the object from the record of user permission rights responsive to detecting the change in location of the object.

3. The method of claim 1, wherein the object is a virtual machine.

4. The method of claim 1, further comprising:
    defining preauthorization permissions for object operations.

5. The method of claim 4, wherein the preauthorization permissions comprise permission to add an object to the virtualization environment, permission to clone an object, permission to backup an object, and/or permission to add data for storage in an object.

6. The method of claim 5, wherein one of the preauthorization permissions is based on location in the virtualization environment.

7. The method of claim 5, wherein one of the preauthorization permissions is based on an identification of a user associated with a request to perform an operation on an object.

8. The method of claim 4, further comprising:
receiving a request to perform an operation on the object;
determining if the operation is permissible based on the preauthorization permissions for the current location of the object; and
allowing the operation when the operation is determined to be permissible.

9. The method of claim 1, further comprising:
associating user permission rights with a user role; and
determining that a user is assigned to the user role;
wherein updating the record of user permission rights associated with the object locations comprises updating the record of user permission rights associated with the object locations with the user permission rights associated with the user role.

10. The method of claim 1, wherein updating the record of user permission rights associated with the object locations comprises:
determining if the user permission rights for the current location can be updated in the record of user permission rights without authorization; and
updating the record of user permission rights associated with the object locations with the user permission rights for the current location responsive to determining that the user permission rights for the current location can be updated in the record of user permission rights without authorization.

11. The method of claim 10, wherein updating the record of user permission rights associated with the object locations further comprises:
initiating an authorization request to update the user permission rights for the current location responsive to determining that the user permission rights for the current location cannot be updated in the record of user permission rights without authorization;
receiving authorization to update the record of user permission rights associated with the object locations with the user permission rights for the current location; and
updating the record of user permission rights associated with the object locations with the user permission rights for the current location responsive to receiving authorization to update the record of user permission rights associated with the object locations with the user permission rights for the current location.

12. A virtualization system, comprising:
a permission store to maintain a record of user permission rights associated with object locations in the virtualization system;
a dynamic monitor to detect a change in location of an object within a virtualization environment; and
a permission controller to determine user permission rights for a current location of the object responsive to detection of the change in location of the object, and to update the record of user permission rights with the user permission rights for the current location of the object;
wherein the virtualization environment is a first virtualization environment and the change in location is one of the following:
movement of the object from a first container in the virtualization environment to a second container in the virtualization environment the first and second containers being logically independent of each other; and
movement of the object from the first virtualization environment to a second virtualization environment.

13. The virtualization system of claim 12, wherein the permission controller is further to delete user permission rights for a previous location of the object from the record of user permission rights responsive to detecting the change in location of the object.

14. The virtualization system of claim 12, wherein the object is a virtual machine.

15. A non-transitory computer program product for managing a virtualization system comprising:
a computer readable storage medium having computer readable program code embodied in the medium, the computer readable program code comprising:
computer readable program code to detect a change in location of an object within a virtualization environment;
computer readable program code to determine user permission rights for a current location of the object responsive to detecting the change in location of the object; and
computer readable program code to update a record of user permission rights with the user permission rights for the current location of the object;
wherein the virtualization environment is a first virtualization environment and the change in location is one of the following:
movement of the object from a first container in the virtualization environment to a second container in the virtualization environment the first and second containers being logically independent of each other; and
movement of the object from the first virtualization environment to a second virtualization environment.

16. The non-transitory computer program product of claim 15, further comprising:
computer readable program code to delete user permission rights for a previous location of the object from the record of user permission rights responsive to detecting the change in location of the object.

* * * * *